United States Patent
Stiles et al.

(10) Patent No.: US 9,717,296 B2
(45) Date of Patent: Aug. 1, 2017

(54) LOCKING CLIP AND ANCHOR ASSEMBLY FOR A TETHER

(71) Applicant: SCHROTH SAFETY PRODUCTS GMBH, Arnsberg (DE)

(72) Inventors: Mark Anthony Stiles, Atlanta, GA (US); Stephen Joseph Drabant, Lawrenceville, GA (US); Donald Thomas Myers, Warstein (DE)

(73) Assignee: SCHROTH SAFETY PRODUCTS GMBH, Arnsberg (DE)

( * ) Notice: Subject to any disclaimer, the term of this patent is extended or adjusted under 35 U.S.C. 154(b) by 277 days.

(21) Appl. No.: 14/551,516

(22) Filed: Nov. 24, 2014

(65) Prior Publication Data

US 2016/0143402 A1    May 26, 2016

(51) Int. Cl.
*F16G 11/00* (2006.01)
*A42B 3/04* (2006.01)
*B60R 21/00* (2006.01)

(52) U.S. Cl.
CPC .... *A42B 3/0473* (2013.01); *B60R 2021/0048* (2013.01); *B60R 2021/0086* (2013.01)

(58) Field of Classification Search
CPC ........ A42B 3/0473; F16B 21/09; F16B 21/02; F16B 21/06; Y10T 24/45597; Y10T 24/45262; Y10T 24/499; Y10T 24/4599; Y10T 24/47; Y10T 24/45; Y10T 24/45225; Y10T 24/45251; Y10T 24/45257; Y10T 24/45267; Y10T 24/45272; Y10T 24/45487; Y10T 24/45492; Y10T 24/45508; Y10T 24/4016; Y10T 24/45052; Y10T 24/4578; Y10T 24/4745; Y10T 403/60; Y10T 403/604; Y10T 403/606
See application file for complete search history.

(56) References Cited

U.S. PATENT DOCUMENTS

| | | | | |
|---|---|---|---|---|
| 985,887 | A * | 3/1911 | England | F16B 21/06 24/607 |
| 2,640,246 | A * | 6/1953 | Shomber | F16B 21/09 24/628 |
| 3,583,042 | A * | 6/1971 | Ishizaka | A45C 11/38 24/265 R |
| 4,586,843 | A * | 5/1986 | Heng | H02B 1/048 200/295 |
| 4,915,413 | A * | 4/1990 | Meyer | A44B 11/2549 24/628 |
| 6,640,400 | B1 * | 11/2003 | Chen | A45C 13/1076 190/18 A |
| 8,011,848 | B2 * | 9/2011 | Sockman | A46D 3/08 403/325 |

(Continued)

*Primary Examiner* — Victor Batson
*Assistant Examiner* — Matthew Sullivan
(74) *Attorney, Agent, or Firm* — Barnes & Thornburg LLP; Jason Bernstein

(57) ABSTRACT

A locking clip and anchor assembly for a tether. The clip includes an opening with at least one tab extending into a portion of the opening. The clip is also configured to attach to a tether or strap. In exemplary embodiments, the anchor assembly includes a post, biased support, biasing mechanism, and base. The clip is configured to be connectable to the post and movable to latched and unlatched conditions with respect to the anchor assembly. In the latched condition the clip has a limited range of rotation possible about the post.

38 Claims, 22 Drawing Sheets

(56) References Cited

U.S. PATENT DOCUMENTS 9,223,191 B2 * 12/2015 Fujiwara ............... G03B 17/566
9,344,536 B2 *  5/2016 Weber ................. H04M 1/0202
9,532,474 B2 * 12/2016 Gutschenritter ..... H05K 5/0221

* cited by examiner

LOCKING CLIP AND ANCHOR ASSEMBLY FOR A TETHER

FIELD

The present disclosure relates to a helmet restraint support structure and, in exemplary embodiments, to an anchor and tether assembly that attaches to the helmet to restrain excess movement of a user's head and neck.

BACKGROUND

Proper attachment and orientation of a tether to a helmet used by race car drivers is critical to proper function of a helmet restraint system. Typically, a helmet has a pair of tether anchors, one located on each side of the helmet proximate to a user's ear. The tether anchor detachably connects to a tether clip, which in turn is connected to a tether strap that is part of a head and neck restraint apparatus worn about the user's neck, shoulders and torso to reduce injury in the event of a crash or other incident. The tether strap is constructed to have a specific useable length to limit forward-backward movement of the user's head, but permit limited turning of the head. Many helmet restraint systems require the length of the tether to be adjusted, or personalized, to the specific user's physique. If the tether anchor is attached to the helmet improperly, such as the tether clip being attached upside down, the tether strap may become twisted, which reduces the effective usable length of the tether, which in turn excessively restricts movement of the user's head. It would be desirable to have a tether clip and anchor assembly that would prevent improper attachment of the tether strap. It would also be desirable to have a tether clip and anchor assembly that would be easy for a user to attach with minimal effort, yet remain secure and in the proper orientation during use. It would be further desirable to have a tether clip and anchor assembly that would have reduced likelihood of undesirable decoupling when a crash force causes tension in the strap to be nonorthogonal to the anchor assembly and nonparallel to the tether clip.

SUMMARY

One exemplary embodiment of the present disclosure provides anchor and clip assemblies that employ push-twist-release functionality to both latch and unlatch the clip (attached to the tether) to and from the anchor (attached to the helmet). A specially designed labyrinth slot configuration on a post as part of the anchor assembly receives a tab attached to the clip to easily secure the clip to the anchor assembly. By virtue of this push-twist-release design, the clip may be shorter than conventional clips which possibly allows for more direct force to be applied before the clip twists or bends. A shorter clip length may also equal less demand on material, less tether twisting, be easier to operate, and may not over-rotate to unlock.

The labyrinth design on the post includes an additional slot portion that allows the clip to rotate some amount relative to the anchor assembly, but not a full 360 degrees. This may result in less twisting of the tether, which results in maintaining the proper effective length of the tether in relation to the helmet and clip. There may also be multiple labyrinth slots in the post that accommodate multiple tabs in the clip. These multiple tabs may be asymmetrical to each other to promote only one orientation for the clip to couple to the labyrinth slot on the post. The tabs may also be differently shaped and oriented to further reinforce an intended latching orientation.

In exemplary embodiments, to assist holding and operating the clip, one or more flanges may extend from the clip providing a gripping surface. The flanges may also assist orienting the operator by intuitively identifying the correct orientation. In still another exemplary embodiment, the labyrinth slots in the post may be sized to accommodate stacked clips to secure same to the anchor assembly. In addition, the clip may be bendable at a predesigned zone relative to the post to, in part, help manage loadings on the post imparted via the clip and its tab or tabs when the incident of loading is not orthogonal to the axis of the post or is not parallel with the plane of the clip. In such loading circumstances the clip may deform and the location of any deformations may be managed by the disposition of the flanges, notches or other features or construction design of the clip.

One exemplary embodiment provides a locking clip and anchor assembly for a tether. The clip is adapted to attach to a tether, the clip comprising a base portion, an opening defined in the base portion, at least one tab extending into a portion of the opening, and at least one tether attachment means defined in the base portion. The an anchor assembly may comprise a base member, a post adapted to connect to the base, the post comprising an upper rim and a lower rim, and first, second, third and fourth slot portions, the first slot portion configured to receive the tab of the clip from exterior of the post, the second slot portion in communication with the first slot portion, and a catch in communication with the second slot portion to separate the first slot portion from the third slot portion, the third slot portion having a first part and a second part. The anchor assembly may further comprise a biased support member having a top rim and a bottom surface and having an aperture adapted to receive the post and supported by the base, the biased support member being adapted to be biased in a position closer to the post upper rim and adapted to be an unbiased position closer to the base member when the clip is associated with the base member. The anchor assembly may further comprise means for biasing the biased support member.

Another exemplary embodiment provides a locking clip and anchor assembly for a tether, comprising: a clip adapted to attach to a tether, the clip comprising a base portion, an opening defined in the base portion, at least one tab extending into a portion of the opening, and at least one tether attachment means defined in the base portion. The anchor assembly may comprise a post comprising an upper rim and a lower rim, and first, second, third and fourth slot portions, the first slot portion configured to receive the tab of the clip from exterior of the post, the second slot portion in communication with the first slot portion, and a catch in communication with the second slot portion to separate the first slot portion from the third slot portion, the third slot portion having a first part and a second part. The anchor assembly may further comprise a biased support member having an aperture adapted to receive the post, the biased support member being adapted to be biased in a position closer to the post upper rim. The anchor assembly may further comprise a means for biasing the biased support member. The anchor assembly may further comprise a fastener. The anchor assembly is adapted to connect to a helmet, the helmet having an aperture defined therein sized to receive the fastener.

One exemplary embodiment of the present disclosure provides a locking clip and anchor assembly. This assembly includes separate clip and anchor assembly portions. The clip includes an opening with a tab extending into a portion of the opening. The clip is also configured to attach to a tether or strap. The anchor assembly includes a post, biased support, spring, and base. The clip is further configured to be movable to latched and unlatched conditions with respect to the anchor assembly. The biased support is located adjacent the post, is supported by the base, is movable in axially-opposed first and second directions along the post, and is biased in the second direction by the spring. The post includes a first slot portion configured to receive the tab of the clip from exterior of the post, and includes a second slot portion in communication with the first slot portion. The second slot portion is concealed by the biased support when the biased support is moved in the second direction by the spring, and is exposed by the biased support when the biased support is moved in the first direction by the clip that overcomes the bias of the spring. Additionally, the post includes a catch in communication with the second slot portion to separate the first slot portion from a third slot portion which is in communication with both the second slot portion and a fourth slot portion. As such, a first part of the third slot portion is concealed by the biased support when moved in the second direction by the spring. A second part of the third slot portion is exposed both when the biased support is moved in the second direction by the spring, and when the biased support is moved in the first direction by the clip that overcomes the bias of the spring. The clip is pivotable in axially-opposed third and fourth directions with respect to the post when the tab is located in the second slot portion. When the tab is located in the second part of the third slot portion and the biased support is moved in the second direction by the spring and the catch prevents the tab and clip from moving back to, a or the second slot portion in the fourth direction, the clip is located in the latched condition with respect to the anchor assembly.

In illustrative embodiments, the locking clip and anchor assembly may further include: the clip being latched to the post when the tab is located in the second part of the third slot portion and the biased member is moved in the second direction by the bias of the spring that conceals the second slot portion; a fourth slot portion in communication with the second part of the third slot portion; the fourth slot portion being exposed both when the biased support is moved in the second direction by the spring, and when the biased support is moved in the first direction by the clip that overcomes the bias of the spring; the clip and tab being movable in both the third and fourth directions, when the tab is located in the fourth tab portion; the clip being configured to unlatch from the post, when the clip moves the biased support in the first direction to overcome the spring bias and expose the second slot portion; the tab being movable from the third slot portion to the second slot portion, when the clip is movable toward the fourth direction; the tab being movable from the second slot portion to the first slot portion, when the clip continues to move in the fourth direction after having moved in the first direction; the tab being movable out of the first slot portion and separable from the post, when the tab is movable in the second direction which puts the clip in the latched condition with respect to the anchor assembly; a fastener configured to attach the post and base to a helmet; the biased support being a ring; the base supports the post; the clip further comprises at least one grippable flange; the clip further comprises a plurality of grippable flanges; the clip being bendable under certain loading conditions; the post, biased support, spring, and base are all cylindrically shaped; wherein the post is located in a cavity in the biased support and supported by the base, and wherein the biased support and spring are supported in a cavity in the base, and wherein the biased support and spring are movable with respect to the base; the opening in the clip being substantially circular; the opening in the clip includes a second tab extending into a portion of the opening wherein the second tab is spaced apart from the tab, wherein the post further comprises a second set of first, second, and third slot portions that receive the second tab and are correspondingly configured the same as the first, second, and third slot portions that receive the tab; the opening in the clip being substantially circular and the second tab is spaced apart from the tab at a location that is selected from the group consisting of about 180 degrees apart, less than about 180 degrees apart, and about more than 180 degrees apart; the clip being engageable with the post at no more than a single orientation; the second tab being located at an asymmetrical location at the opening with respect to the tab; the catch including an angled surface non-parallel with the second slot portion and configured to urge the tab to the third slot portion and discourage a false latching; a slope located between the third slot portion and the fourth slot portion; and the second part of the third slot portion and the fourth portion being located parallel to a top surface of the biased support.

Additional features and advantages of the locking clip and anchor assembly will become apparent to those skilled in the art upon consideration of the following detailed description of the illustrated embodiments exemplifying best modes of carrying out the locking clip and anchor assembly as presently perceived.

BRIEF DESCRIPTION OF THE DRAWINGS

The present disclosure will be described hereafter with reference to the attached drawings which are given as non-limiting examples only, in which.

Figure 1:
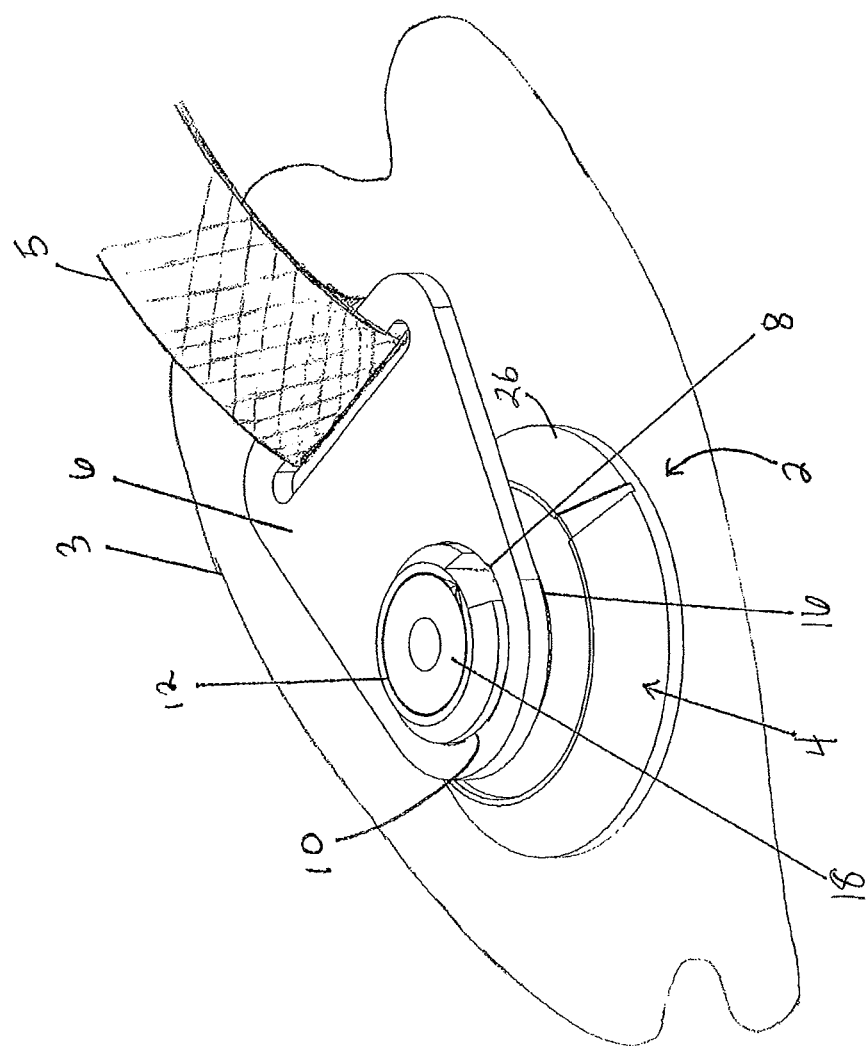
FIG. 1 is a perspective view of an illustrative embodiment of a locking clip and anchor assembly.

Corresponding reference characters indicate corresponding parts throughout the several views. The exemplifications set out herein illustrates embodiments of the locking clip and anchor assembly, and such exemplifications are not to be construed as limiting the scope of the locking clip and anchor assembly in any manner.

DETAILED DESCRIPTION

FIGS. 1-14 show a perspective view of an exemplary embodiment of a locking clip and anchor assembly 2 attached to a helmet portion or like structure 3 and coupled to a tether strap 5. In this embodiment (and, referring to FIG. 1), anchor assembly 4 is attached to helmet portion 3 and clip 6 is coupled to both anchor assembly 4 and tether strap 5. In this illustrative embodiment, clip 6 includes an opening 8 having a tab 10 extending therein to couple to a post 12 having a labyrinth slot 14 (see FIG. 2). Selective engagement between tab 10 and post 12 secures clip 6 to anchor assembly 4. It is appreciated that tether 5 may be attached to a frame, seat, or other support structure (not shown), as well as clip 6, so that when clip 6 is attached to anchor 4 and, thus, helmet 3 will be restrained and remain substantially stationary, or with limited movement. The tether may be any material suitable for providing a restraint, including, but not limited to, strapping, webbing, banding, rope, wire, chain or other generally strong, flexible materials.

One aspect of the present disclosure includes how locking clip and anchor assembly 2 selectively couples and decouples to secure and release tether 5 from helmet 3. In an illustrative embodiment, these functions are accomplished by pressing clip 6 against a biased support, such as, but not limited to, illustrative ring 16 of anchor assembly 4, rotating clip 6 relative to post 12, and then releasing clip 6. Indeed, post 12 is configured so that clip 6 (and tether 5) will be able to pivot some amount with respect to anchor assembly 4 while still attached thereto. To release clip 6, it is pivoted in an opposite direction than which it is secured while also pressing against biased ring 16. When clip 6 is rotated the same distance, but in the opposite direction, clip 6 releases from anchor assembly 4. This, in turn, releases tether 5 from helmet portion 3. How this is accomplished is by locating opening 8 with tab 10 over post 12. More specifically, pushing against biased ring 16 on anchor assembly 4, a portion of labyrinth slot 14 (see FIG. 2) is exposed that may receive tab 10. This is why clip 6 may only be coupled or decoupled when pressing against ring 16. In other words, the only motions that are needed to couple and decouple clip 6 to and from anchor assembly 4 is pressing, rotating, and releasing clip 6.

A fastener 18 is extendable through post 12 and an opening (not shown) in helmet portion 3 to secure anchor assembly 4 to the helmet. In exemplary embodiments, a washer 20 (see FIG. 2) and a nut (not shown) may be positioned between the anchor assembly 4 and the helmet surface to assist in securing the assembly 4 to the helmet.

Figure 2:
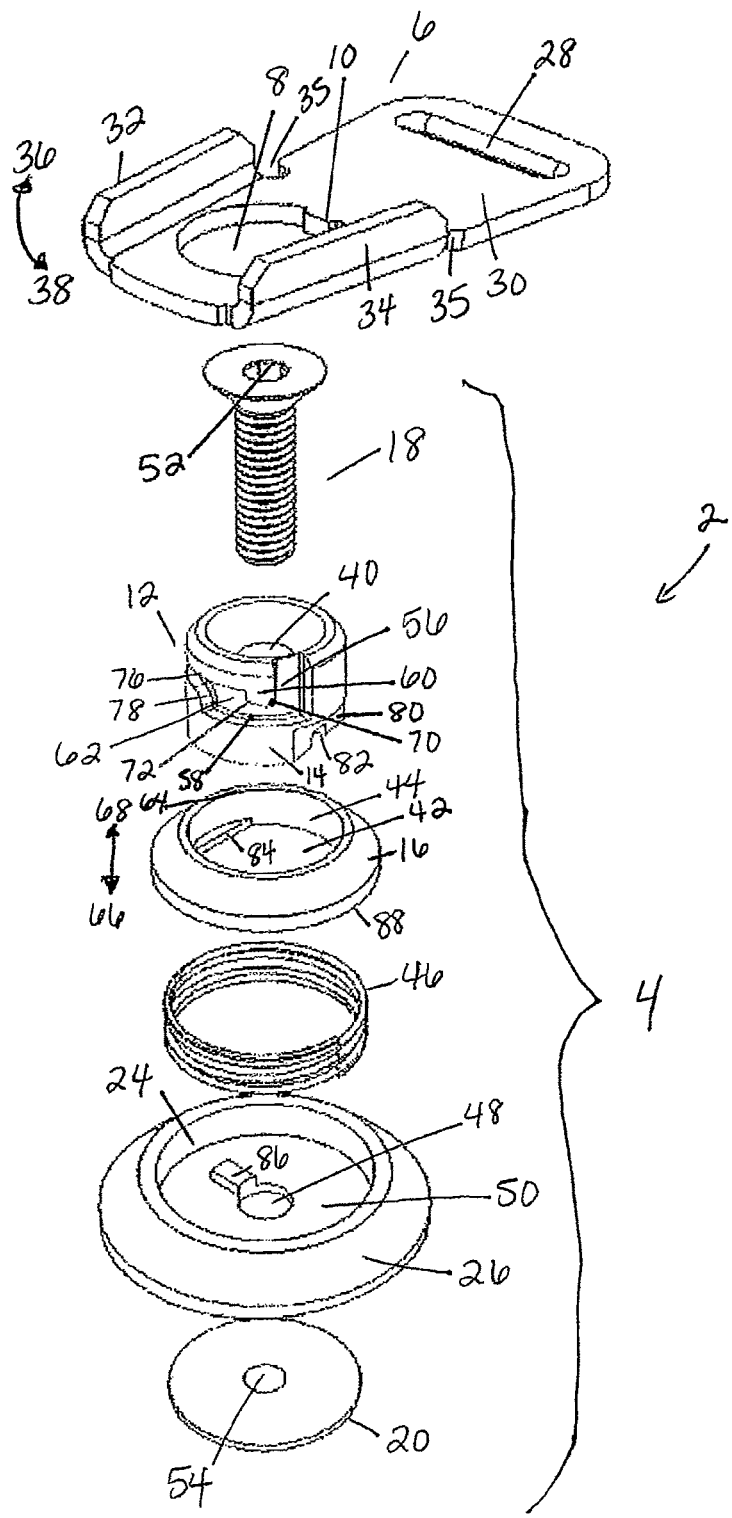
FIG. 2 is an exploded view of the locking clip and anchor assembly.

An exploded view of an exemplary embodiment of a locking clip and anchor assembly 2 is shown in FIG. 2. This view shows clip 6 with opening 8 and tab 10. Illustratively, opening 8 is circular. It is appreciated in other embodiments opening 8 may be any other curved shape. Clip 6 rotates at least partially around cylindrical post 12. Opening 8 may be subject to correct dimensional controls, be any shape in plan provided post 12 has, at least initially, a complementary shape in order to receive clip 6 and then a shape that permits the clip to rotate. This view also shows a tether slot 28 formed in clip 6 spaced apart from opening 8. Slot 28 can receive a portion of tether 5. In alternative exemplary embodiments, other tether attachment means may be used instead of a slot, such as, but not limited to, a snap, hook, clamp, or the like, which matingly connects with a complementary attachment means associated with tether 5. For the purposes of illustration, a slot 28 will be described as a nonlimiting example in connection with various exemplary embodiments. In some exemplary embodiments of clip 6, body portion 30 may include at least one flange, and in exemplary embodiments, a pair of opposing flanges 32 and 34. Flanges 32 and 34 may also serve as gripping surfaces to pivot clip 6 in directions 36 and 38 to couple and decouple clip 6 from anchor assembly 4. Optionally, clip 6 may include notches 35, or other like features that may permit limited and controlled bending of a selected portion of clip 6 to, in part, help manage force loadings (e.g., moment, tension, compression, shear and other forces) on post 12 imparted by tether 5 via clip 6 and its tab 10 when the incident of loading is not orthogonal to the axis of the post 12. In such loading circumstances clip 6 may exhibit limited deformability and the location of any deformations may be managed by the disposition of flanges 32 and 34, notches 35, or other features of the clip. In an alternative exemplary embodiment, clip 6 may include one or more perforations or slots (not shown) at one or more locations across the width of clip 6 to permit controlled bending. For example, when clip 6 is made of metal, the notches 35 create a point where the metal may bend under angled stress to form an angle that may be generally co-parallel with the tether 5 that is applying the stress to clip 6. This results in clip 6 opening being less likely to pop off when the angled pulling tension is applied to the clip. The ability of that part of the clip to bend makes it less likely to pop off the anchor. So, the clip is deformable under stress and the two notches create the guide for the bend to occur at a predefined area.

Fastener 18, illustratively shown as a threaded or partially threaded bolt, extends through illustrative beveled opening 40 in post 12, opening 42 in cavity 44 of biased ring 16, illustrative spring 46, and opening 48 located in base panel 50 in cavity 24 of base 26. Fastener 18 may also be disposed through a hole (not shown) in the helmet to fasten anchor assembly 4 to the helmet. In exemplary embodiments, fastener 18 is a threaded bolt with an Allen wrench head 52. It is further appreciated, however, that the fastener head used to operate the fastener may be of any suitable configuration including a slotted flat head, Phillips head, hex head, or the like. Post 12 may also be formed with a threaded extension such that the style and effect of fastener 18 is achieved in a single component. Opening 54 in washer 20 receives fastener 18 to secure same to the helmet. In this embodiment, a nut (not shown) is used to sandwich the components of anchor assembly 4 to the helmet. It is still further appreciated that the position of fastener 18 and the nut could be reversed. With fastener 18 in the reversed position, the bore of post 12 could be threaded to receive fastener 18 to eliminate the nut.

Post 12, in addition to receiving fastener 18, includes labyrinth slot 14. In this illustrative embodiment, slot 14 includes an engagement slot portion 56 that is open at one end to receive tab 10 of clip 6 exterior of anchor assembly 4. Engagement slot portion 56 is also in communication with lock slot portion 58 which is sized to allow tab 10 to move to engagement slot portion 56 past catch 60 to a locked portion 62 of lock slot portion 58. As will be discussed in further detail hereinbelow, lock slot portion 58 runs generally parallel to the top periphery 64 of ring 16 and is only exposed from anchor assembly 4 when ring 16 is moved out of its way. Typically this is done by pressing down on ring 16 in direction 66. Catch 60 is the barrier that prevents clip 6 from separating from anchor assembly 4 when tab 10 is located in lock portion 62 of lock slot portion 58. Because spring 46 biases ring 16 in direction 68, the lower portion of lock slot portion 58 is only used to move tab 10 between lock portion 62 and engagement slot portion 56. Catch 60 includes a stop portion 70 and angled surface 72. Stop portion 70 assists preventing tab 2 from disengaging from lock portion 62 when bias ring 16 is being biased upward in direction 68, thereby securing clip 6 to anchor assembly 4. Angled surface 72 is configured to assist moving tab 10 toward engagement slot portion 56 when clip 6 is intended to be removed from anchor assembly 4. An upper slot portion 76 extends from lock portion 62 and is in a higher plane than lock slot portion 58. In this illustrative embodiment, tab 10 and thus clip 6 are allowed a certain amount of free rotation while still secured to post 12. This upper slot portion 76 allows that movement. As shown, an illustrative ramp portion 78 assists moving tab 10 into upper slot portion 76 with additional bias of bias ring 16 moving in direction 68 as well.

When decoupling clip 6 from post 12, tab 10 is moveable from upper slot portion 76 back to lock portion 62. As shown, lock portion is in communication with both lock slot portion 58 and upper slot portion 76 so tab 10 can move between the two. When tab is located in lock portion 62, pushing tab 10 downward in direction 66 with the guidance of ramp portion 78 moves tab 10 towards engagement slot portion 56. Pushing clip 6 against ring 16 in direction 66 while rotating tab 10 moves clip 6 towards engagement slot portion 56. At this point, lifting on clip 6 in direction 68 decouples clip 6 from anchor assembly 4 as tab 10 is removed from engagement slot portion 56.

Post 12 in illustrative embodiments may optionally include key notches 80 and key slot 82 in order to set correct positioning with respect to ring 16 and base 26. Illustratively, key notches 80 may be located on opposed sides of post 12 and be configured to receive corresponding key flange 84 in ring 16. In exemplary embodiments, post 12 may include one or more such key notches 86 as necessary to seat post 12 in cavity 44 in ring 16. Similarly, a key 86 may be formed in cavity 24 of base 26, as illustratively shown in FIG. 2, to properly seat post 12 in the correct orientation with respect to base 26.

An illustrative embodiment of ring 16 includes a hub portion 88 configured to receive spring 46. In this embodiment, spring 46 is itself illustratively a ring configured to bias in direction 68 and 66. Spring 46 is fitted in hub portion 88 of bias ring 68 so that when ring 16 is fitted into cavity 24 of base 26, ring 46 pushes off of base panel 50 to bias ring 16 in direction 68. This is, as previously discussed, because tab 10 of clip 6 only has access to lock slot portion 58 while clip 6 pushes ring 16 downward in direction 66. Once that downward force is released, the bias force from spring 46 pushes against ring 16 and, thus, clip 6 pushes tab 10 upward to latch portion 62 while clip 6 is also being rotated in direction 38. Base 26 provides both a collar structure around ring 16 and post 12 and serves as the structure both ring 16 and clip 6 move with respect to, to secure clip 6 to post 12. With base 26 and post 12 fixed to the helmet via fastener 18, ring 16 seated in cavity 24 is free to move in directions 68 and 66 relative thereto. Clip 6 is movable in directions 66 and 68 and pivot and directions 36 and 38 relative to base 26.

Figure 3:
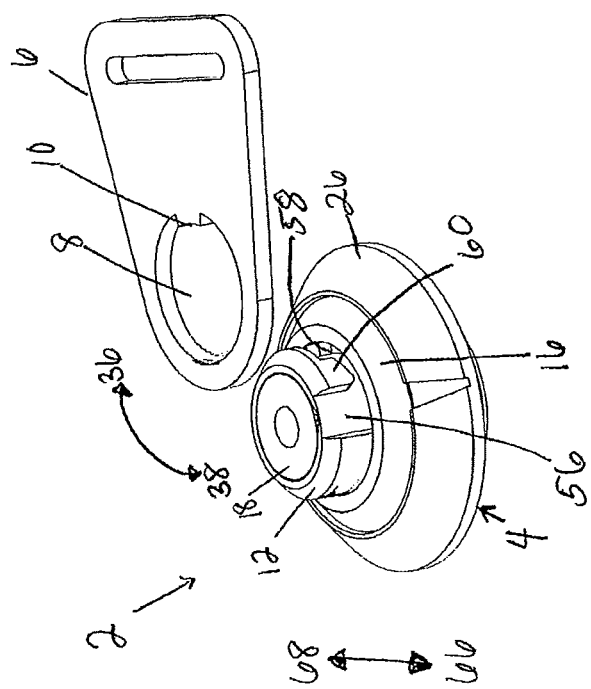
FIG. 3 is a perspective and partially exploded view of the locking clip and anchor assembly.

A perspective view of locking clip and anchor assembly 2 with clip 6 spaced apart from anchor assembly 4 is shown in FIG. 3. Opening 8 fits over post 12 so tab 10 aligns with engagement slot portion 56. It is appreciated that this is the only alignment that will cause clip 6 to engage and secure to post 12. It is also appreciated that the profile of tab 10 may be modified so that if desired, it will not be possible to flip clip 6 over and couple it to post 12. If the profile of tab 10 matches the profile of slot 56, and, if these profiles are not symmetrical, flipping clip 6 over would ensure that tab 10 will not fit in slot 56. Under circumstances where tab 10 does fit into slot 56, ring 16 may be pushed downward in direction 66 to reveal lock slot portion 58. Clip 6 may then be rotated in direction 38 so tab 10 will move to slot portion 62 to lock clip 6 in place. It is appreciated that because ring 16 is not being pressed down by clip 6, slot portions 58 and 62 are not visible. As shown in FIG. 2, It is further appreciated that base 26 is configured to receive ring 16, post 12, spring 46, and fastener 18.

Figure 4:
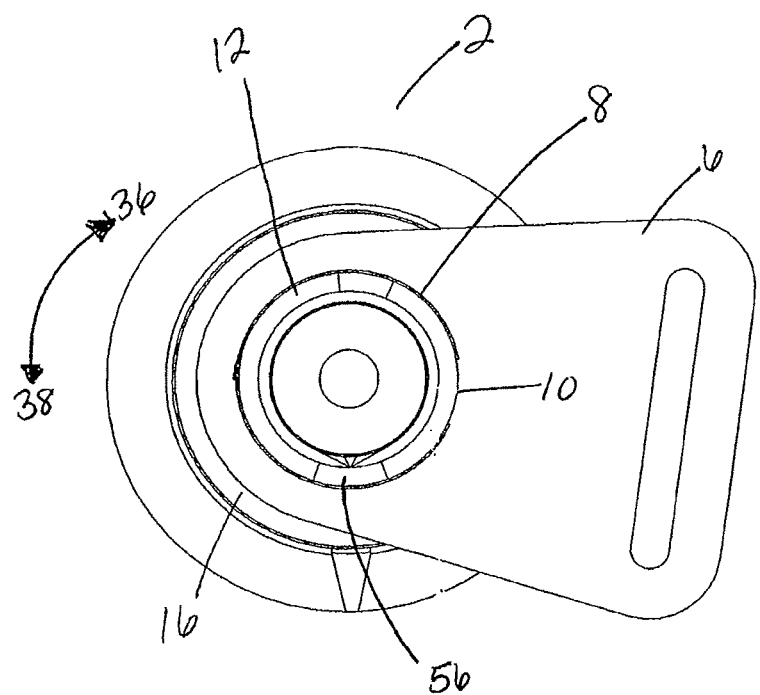
FIG. 4 is a top view of the locking clip and anchor assembly.
Figure 5:
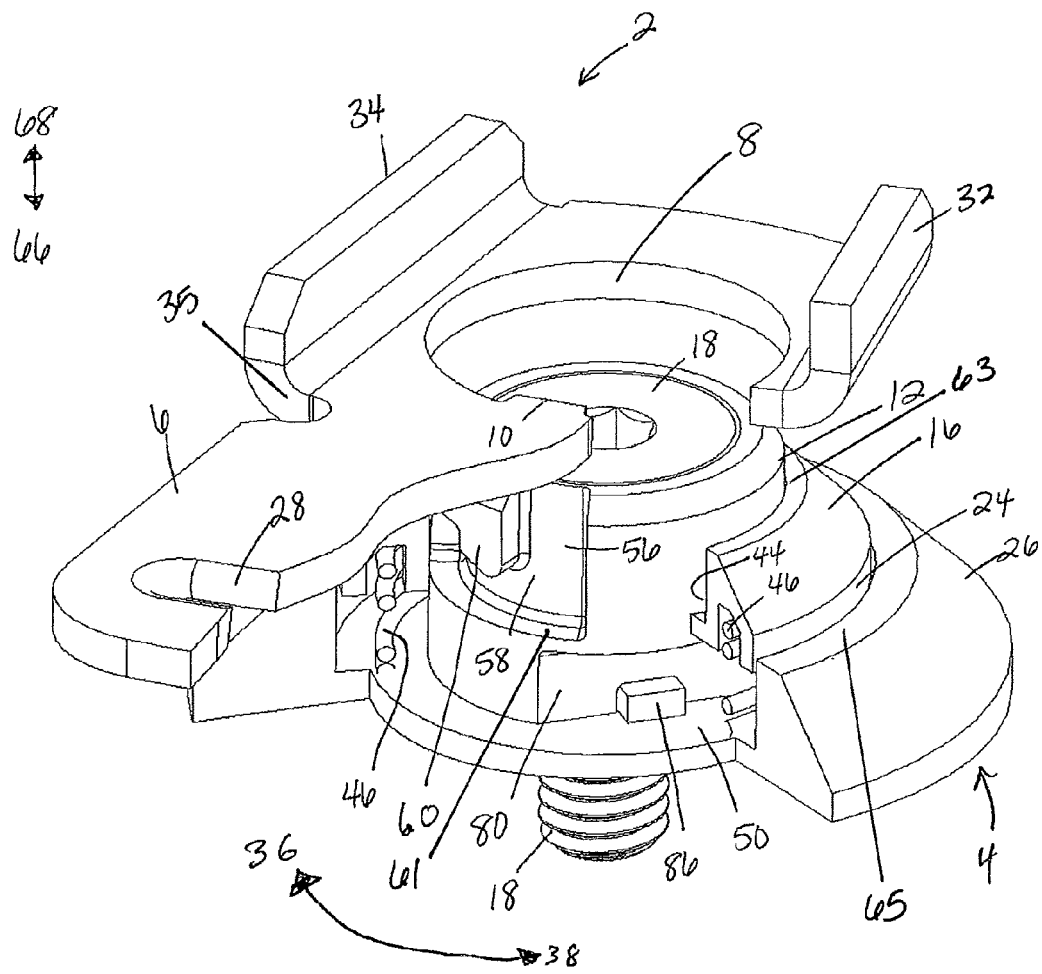
FIG. 5 is a perspective partially-cutaway view of the locking clip and anchor assembly showing the clip descending onto the post.

A top view of locking clip and anchor assembly 2 is shown in FIG. 4. This view demonstrates how opening 8 of clip 6 aligns with post 12 so that tab 10 will fit into engagement slot portion 56. As shown in FIG. 5, clip 6 is only rotatable in directions 38 and 36 after it has pressed downward in direction 66 onto ring 16 so that tab 10 may be pivoted into lock slot portion 58 herein.

Figure 6:
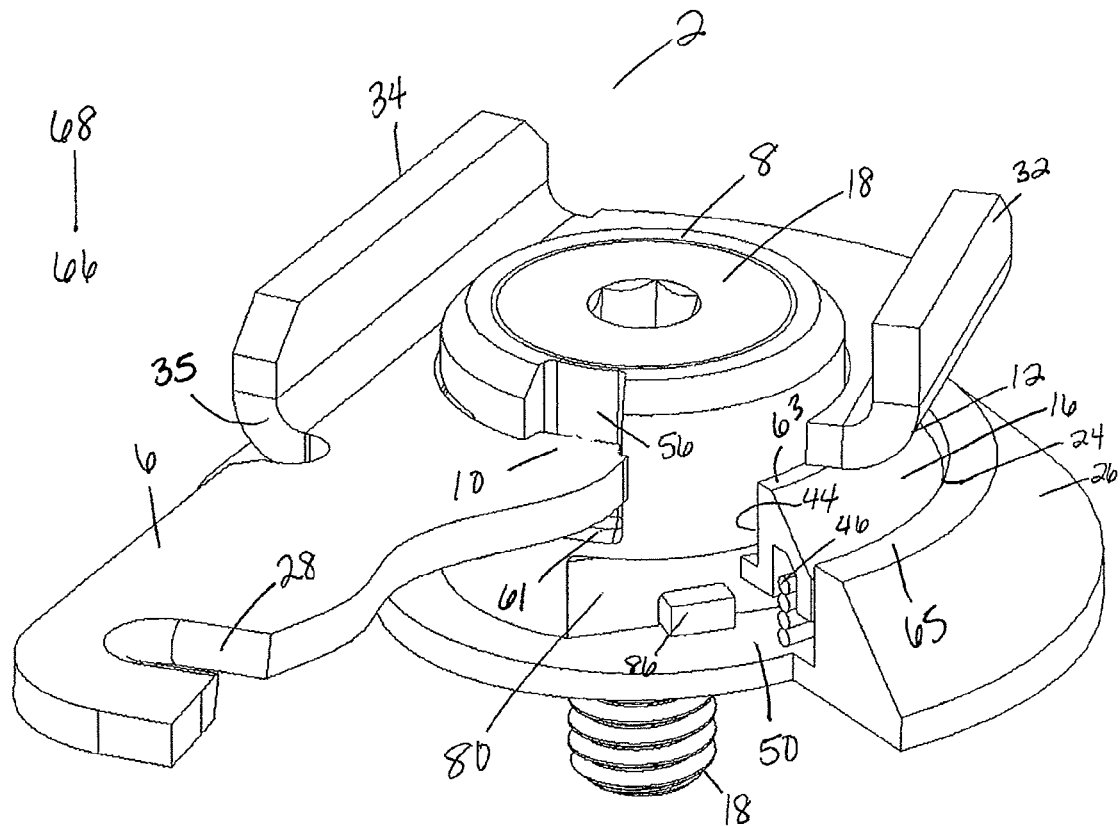
FIG. 6 is another perspective partial-cutaway view of the locking clip and anchor assembly showing the clip positioned onto the post.
Figure 7:
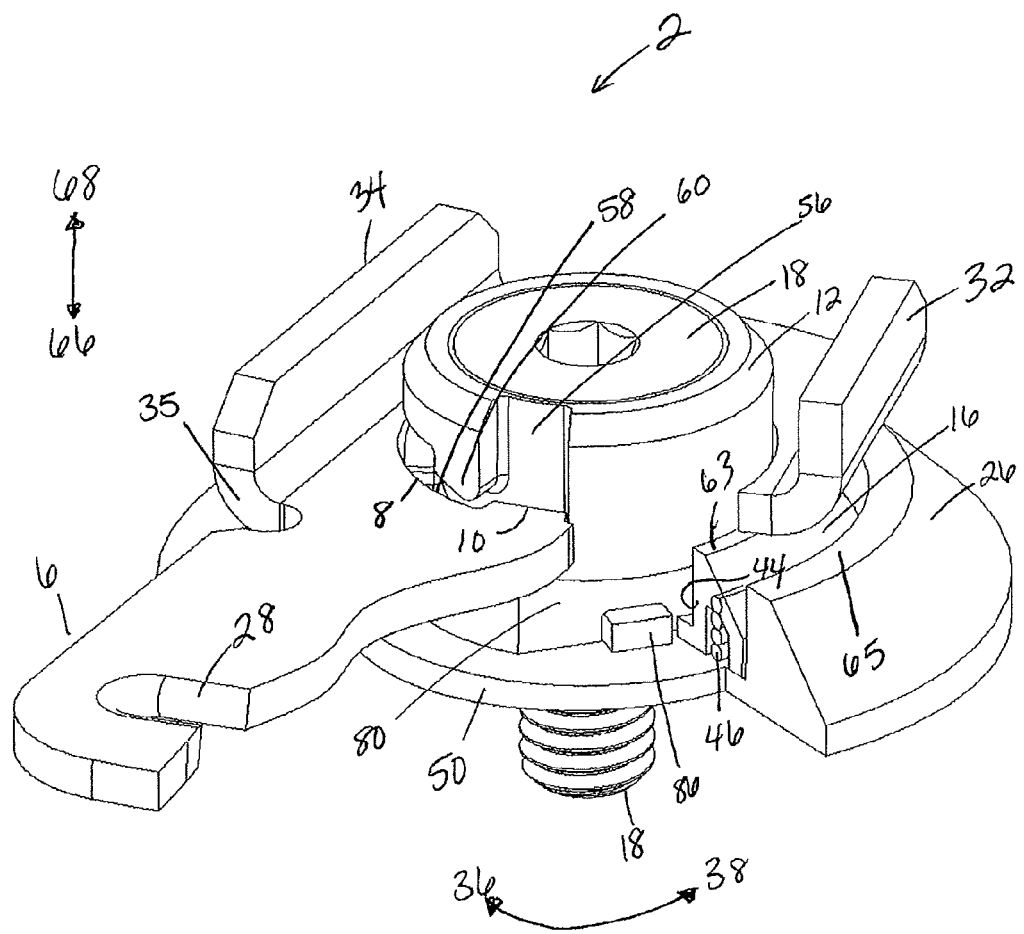
FIG. 7 is another perspective partial-cutaway view of the locking clip and anchor assembly showing the clip descending further onto the post.
Figure 8:
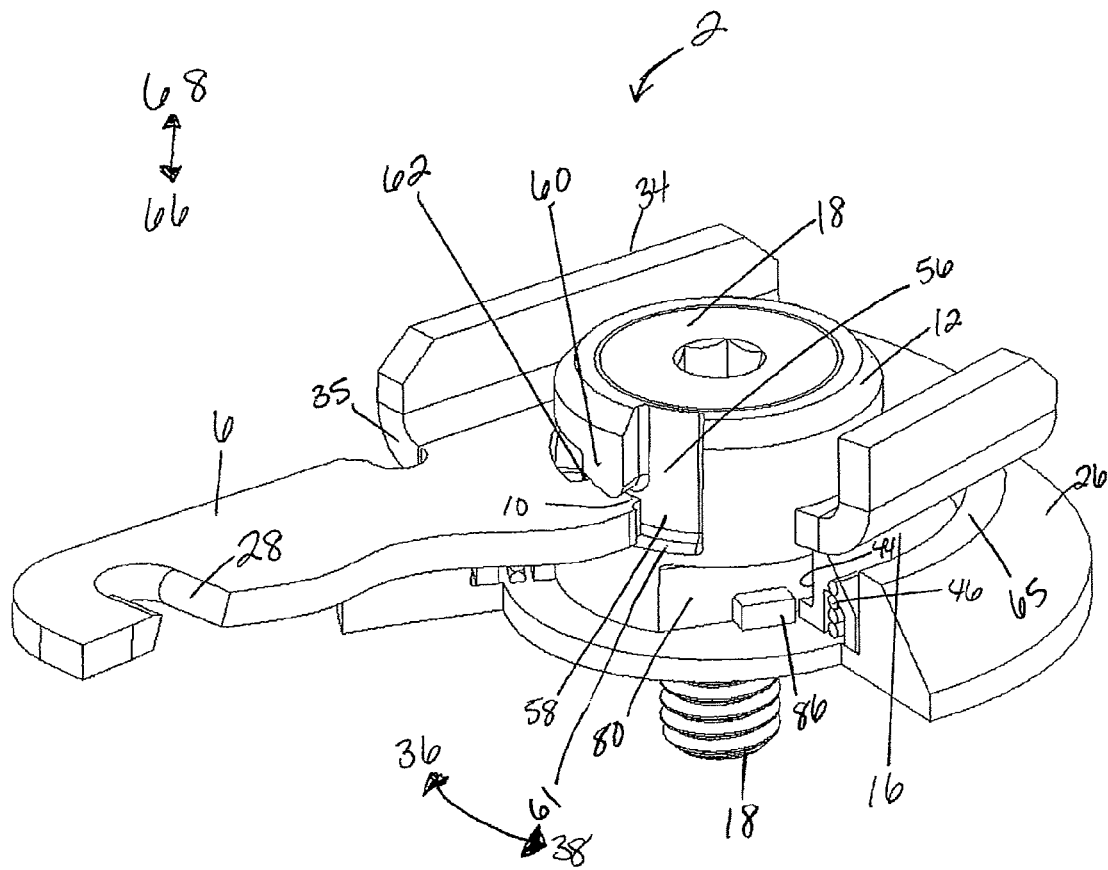
FIG. 8 is another perspective partial-cutaway view of the locking clip and anchor assembly showing the clip pivoting and engaging the slot in the post.
Figure 9:
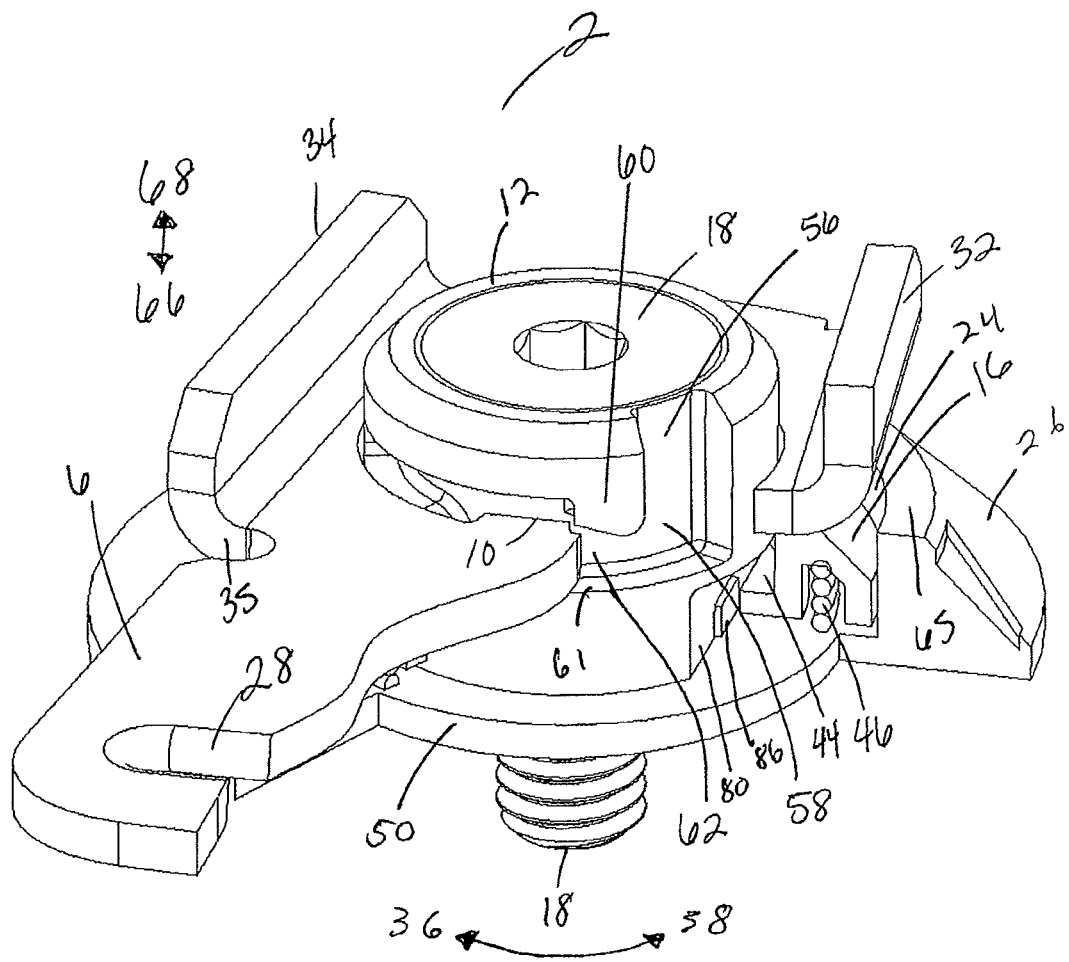
FIG. 9 is another perspective partial-cutaway view of the locking clip and anchor assembly showing the clip pivoting and engaging the slot in the post and extending beyond and below the catch.
Figure 10:
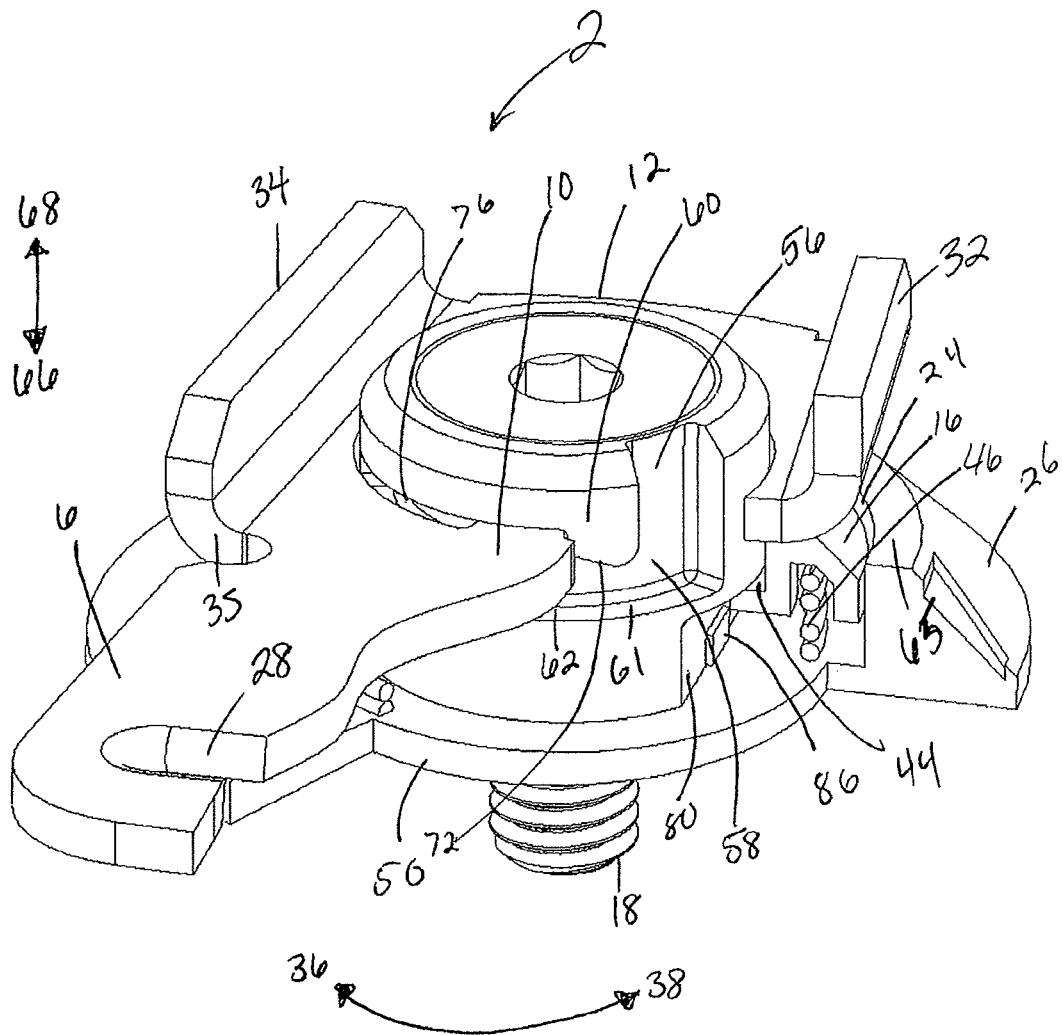
FIG. 10 is another perspective partial-cutaway view of the locking clip and anchor assembly showing the clip pivoting even further into the slot of the post.
Figure 11:
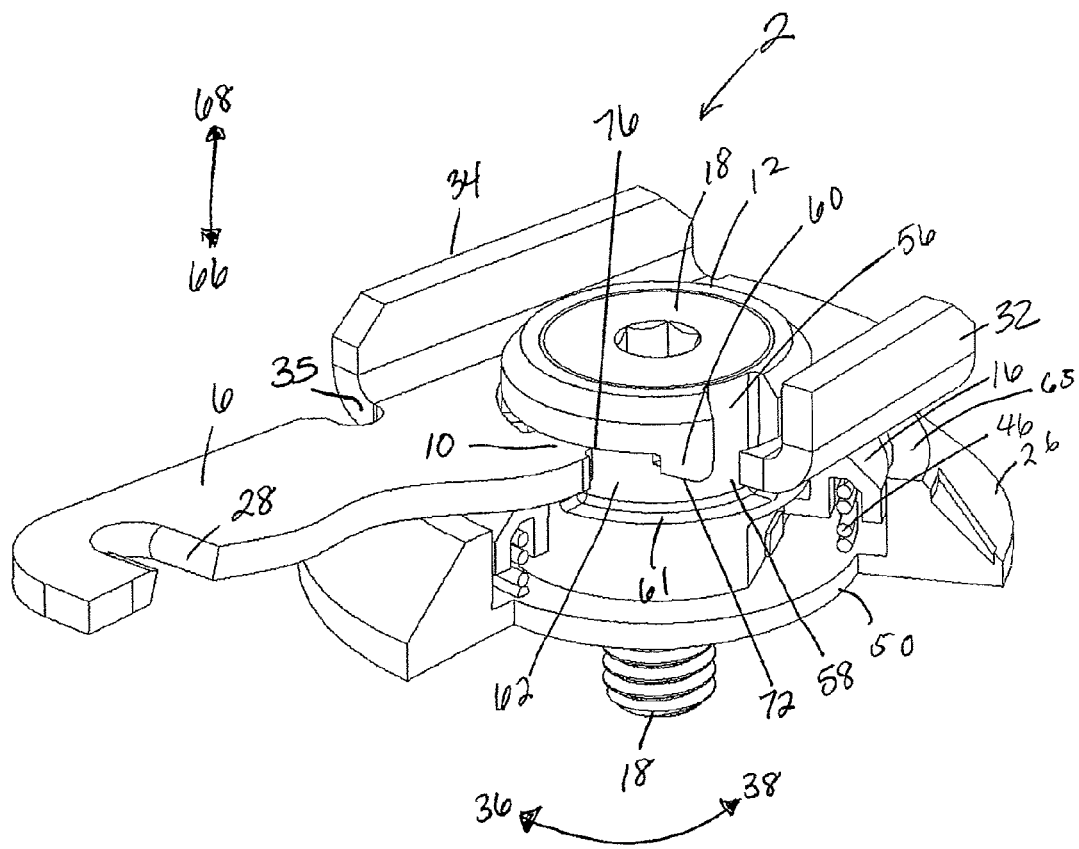
FIG. 11 is another perspective partial-cutaway view of the locking clip and anchor assembly showing the clip in the slot and the biased support member abutting the clip such that the tab cannot rotate past the catch.
Figure 12:
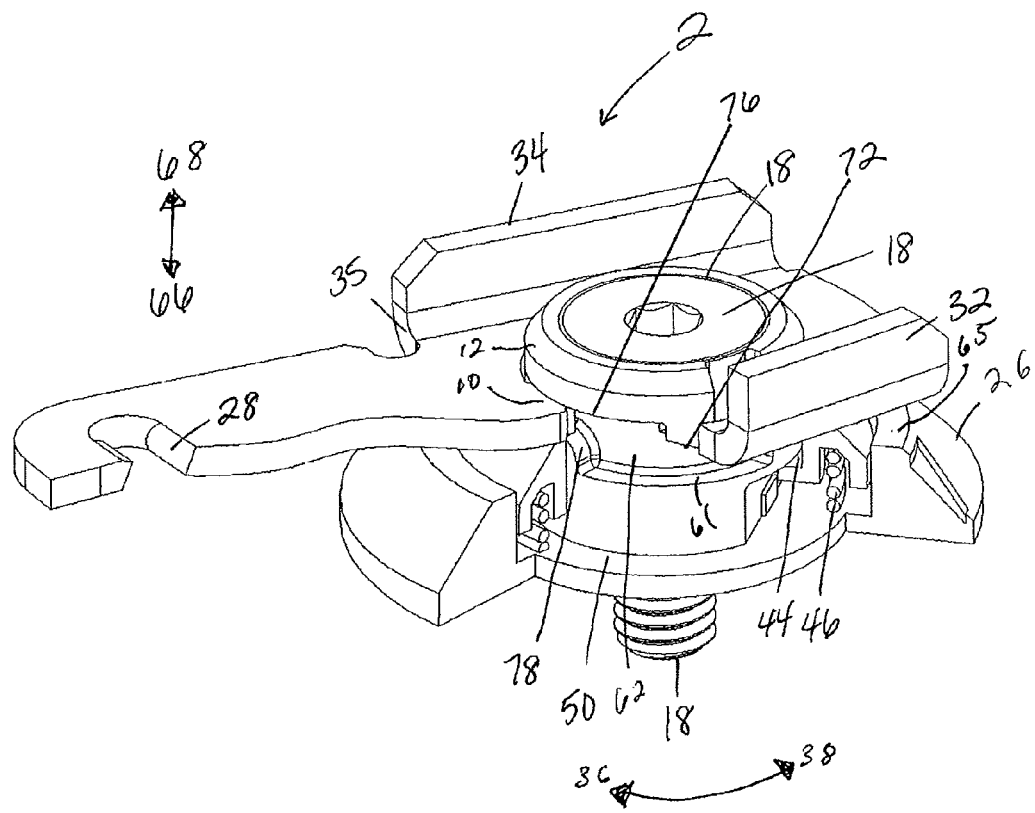
FIG. 12 is another perspective partial-cutaway view of the locking clip and anchor assembly showing the clip pivoting in the slot.
Figure 13:
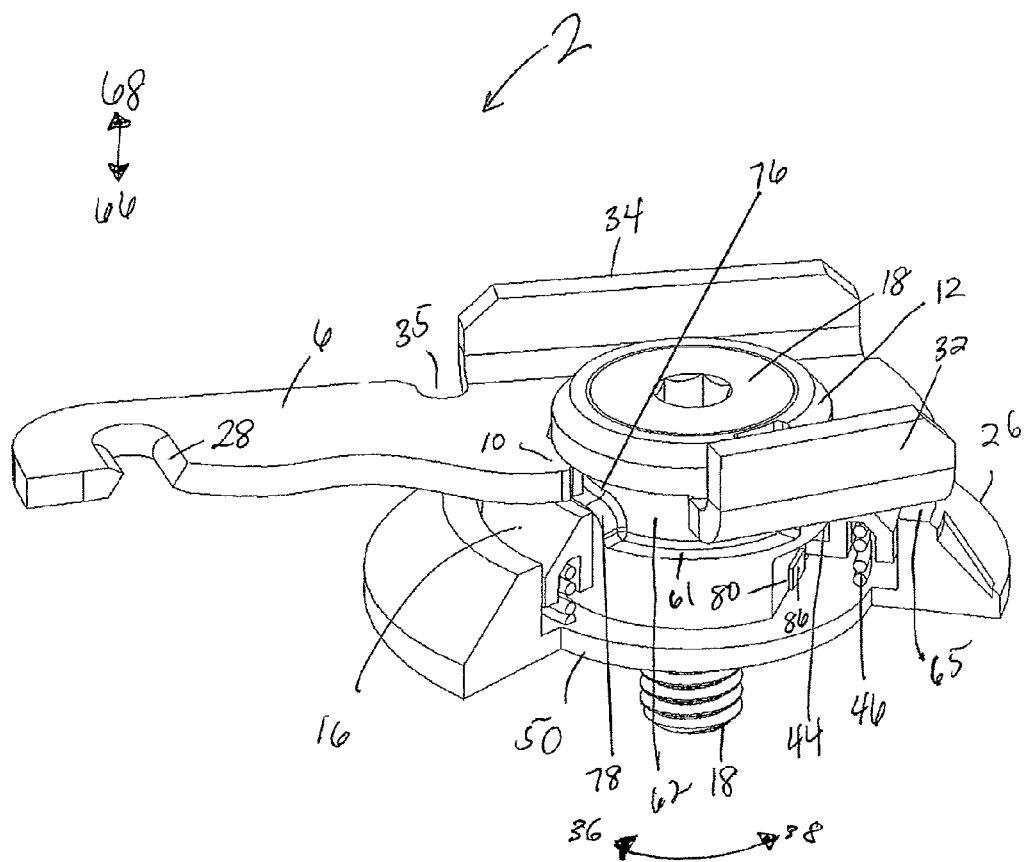
FIG. 13 is another perspective partial-cutaway view of the locking clip and anchor assembly showing the clip in the slot in a fully pivoted position.

The sectional views in FIGS. 5-13 depict an exemplary embodiment of the progression of how clip 6 attaches to anchor assembly 4. As previously discussed, opening 8 on clip 6 descends onto post 12 such that tab 10 aligns with engagement slot portion 56, as shown in FIGS. 5 and 6. Clip 6 moves on to post 12 in direction 66 to the extent that it pushes ring 16 in direction 66 as well. As shown in FIG. 7, clip 6 pushes ring 16 downward in direction 66 to the extent that ring 16 exposes lock slot portion 58 on post 12 that is in communication with engagement slot portion 56. It is appreciated that slot portion 58 is only accessible to tab 10 while ring 16 is moved downward sufficient to expose it. Once tab 10 has been pushed down to the level of lock slot portion 58, clip 6 is rotated in direction 36 sufficient to move tab 10 along slot portion 58 under catch 60 and into locked portion 62. As shown in FIGS. 8-9, the travel of tab 10 down to the level of lock slot portion 58 may be limited by the contact of its underside with the surface 61 or the contact of the underside of clip 6 with either the upper surface/extremity 63 of the ring or the upper surface/extremity 65 of the base 26. As shown in FIG. 10, when downward force is released from clip 6 after tab 10 has been rotated into lock portion 62, tab 10 is lifted in direction 68 by the bias of spring 46 being exerted on ring 16. As shown in FIG. 11, with tab 10 moved upward into locked portion 62, rotating it in the opposite direction causes it to engage catch 60 which prevents tab 10 from re-entering engagement slot portion 56. As shown in FIGS. 12-13, the only place tab 10 can move is between this upper space of lock portion 62 and upper slot portion 76 that is in communication therewith. This allows rotational movement of clip 6 relative to post 12 without any risk of clip 6 detaching from post 12.

In sum, clip 6 is selectively attached to post 12 and aligning tab 10 with slot portion 56 pressing clip 6 downward, then pivoting clip 6 and releasing clip 6. This push, twist, and release movement is all that is needed to attach tether 5 with clip 6 on to anchor assembly 4, presumably attached to the helmet.

It is further appreciated that to remove clips 6 from post 12 in the position shown in FIG. 13, the reverse push, twist, and release movement is made. In other words, by following the reverse progression of the structures from FIG. 13 through to FIG. 5, clip 6 will exit engagement slot portion 56 (as shown in FIG. 11) in direction 68.

Figure 14:
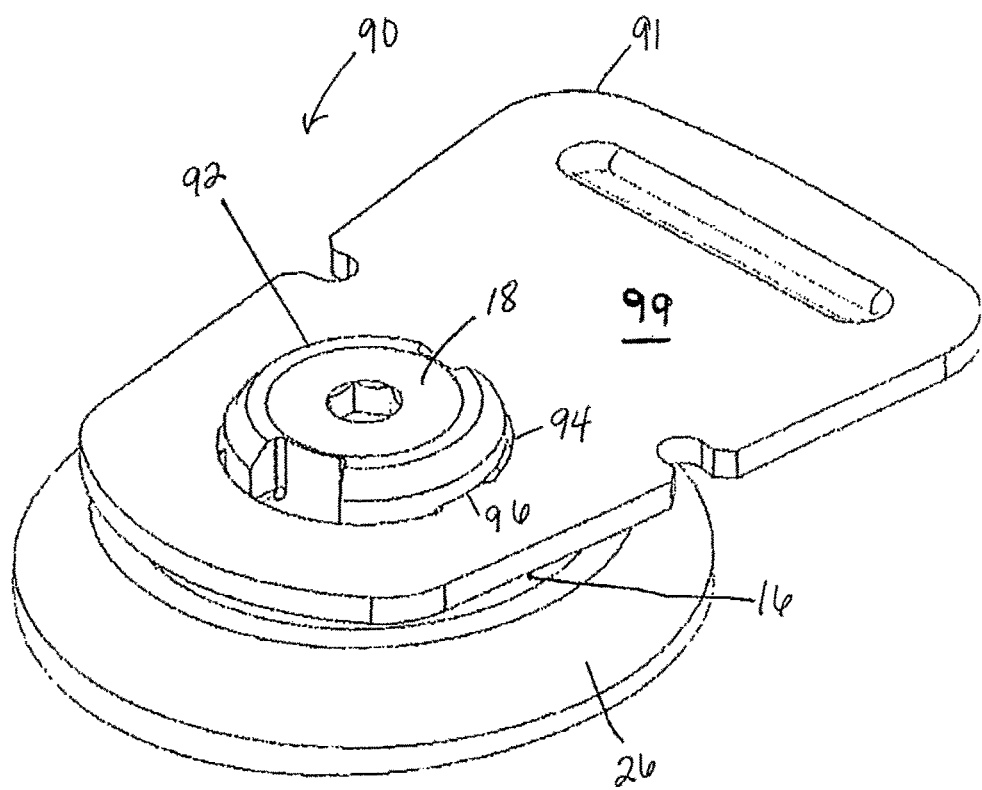
FIG. 14 is a perspective view of another illustrative embodiment of the locking clip and anchor assembly.
Figure 15:
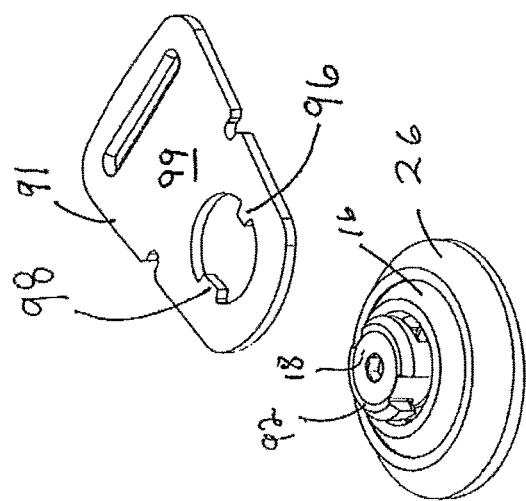
FIG. 15 is another perspective view of the embodiment of the locking clip and anchor assembly of FIG. 14 with the clip spaced apart from the anchor assembly.
Figure 16:
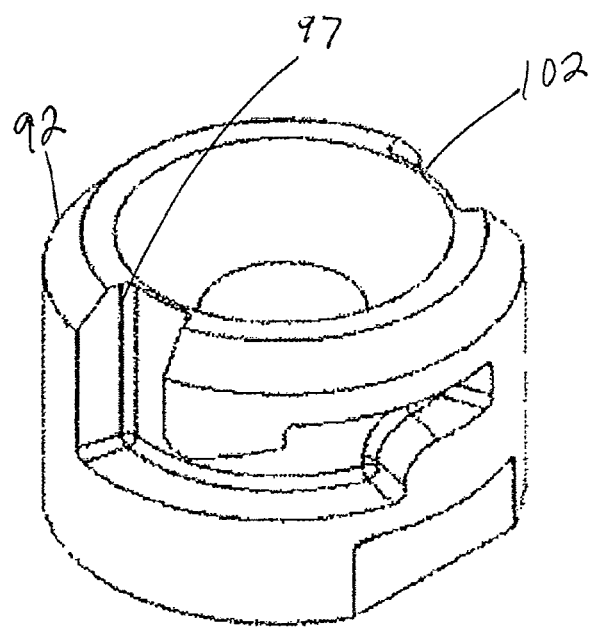
FIG. 16 is a perspective view of a post from the locking clip and anchor assembly of FIG. 14.

Another illustrative embodiment of the present disclosure, as shown in FIGS. 14-16, includes a locking clip and anchor assembly 90 that includes a clip 91 that couples to post 92 that in turn couples to ring 16 and base 26. This embodiment differs in that clip 91 includes an opening 94 having two tabs 96 and 98.

As shown in FIGS. 15 and 16, clip 91 and post 92 are similar to the corresponding clip 6 and post 12 discussed hereinabove, except that in this exemplary embodiment clip 91 includes two tabs 96 in 98 that fit into corresponding engagement slot portions 97 and 102. It is appreciated that the operation of coupling and uncoupling clip 91 to and from post 92 is the same process as that described with respect to clip 6 and post 12, as discussed hereinabove. In one exemplary embodiment, tabs 96 and 98 are located across the ring 16 from each other (about 180°).

In another exemplary embodiment, tabs 96 and 98 may be positioned less than 180° from each other or more than 180° from each other. This asymmetrical positioning results in operation where clip 91 can only be attached to post 92 in one orientation; i.e., the top face 99 of clip 91 will be facing outward (away from the base 26 and helmet 5) and clip 91 cannot be connected so that the top face will be facing inward (toward base 26). This construction prevents a user from connecting clip 91 to post 92 in a flipped orientation and thus prevents the tether from being twisted and its effective usable length undesirably shortened.

Figure 17:
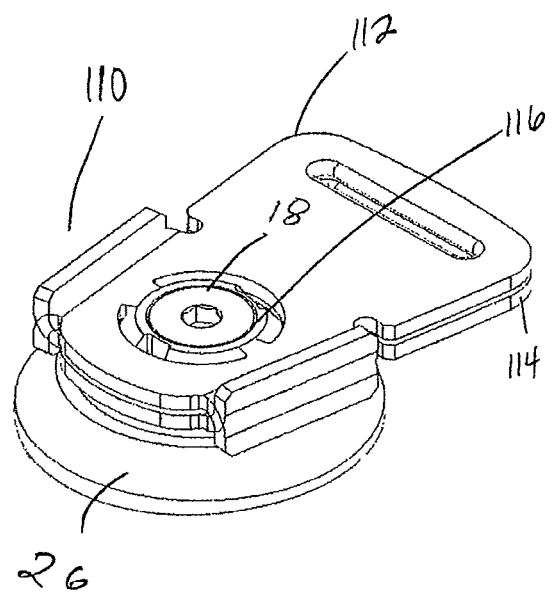
FIG. 17 is a perspective view of another illustrative embodiment of the locking clip and anchor assembly.

FIG. 17 shows a perspective view of an alternative exemplary embodiment of a locking clip and anchor assembly 110. This version includes a pair of stacked clips 112 and 114 attachable to a post 116. In this embodiment, post 116 is configured with deeper labyrinth slots to accommodate thicker tabs from stacked clips 112 and 114. It is appreciated that tabs 112 and 114 may each have either one, two, or a plurality of tabs. In exemplary embodiments, neither, either or both clips 112, 114 may have flanges 32, 34 on one or both sides. In an alternative embodiment, a clip may have two or more slots defined therein, each slot being able to accommodate a tether or tether portion. In another exemplary embodiment, such a clip may have the slots at slightly different angles to accommodate tethers (or tether portions) attached at different angles.

Two or more stacked clips 112, 114 may provide alternative additional modes of load management in the device, which may provide greater opportunities to optimize the size and choice of the materials of the device components. Additionally, multiple clips 112, 114, if symmetrical in size and equally spaced around the circumference of the clip/post permit the clip to latch to the post in a number of alternative orientations.

Figure 19:
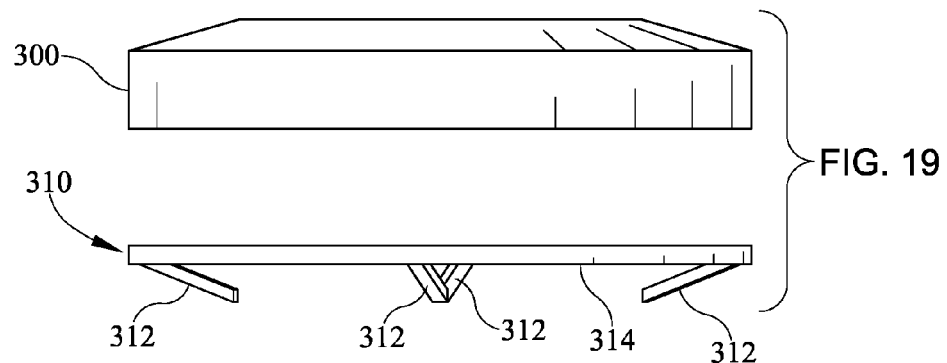
FIG. 19 is a front elevational exploded view of another alternative embodiment of a biasing support and a first exemplary embodiment of a biasing mechanism.
Figure 20:
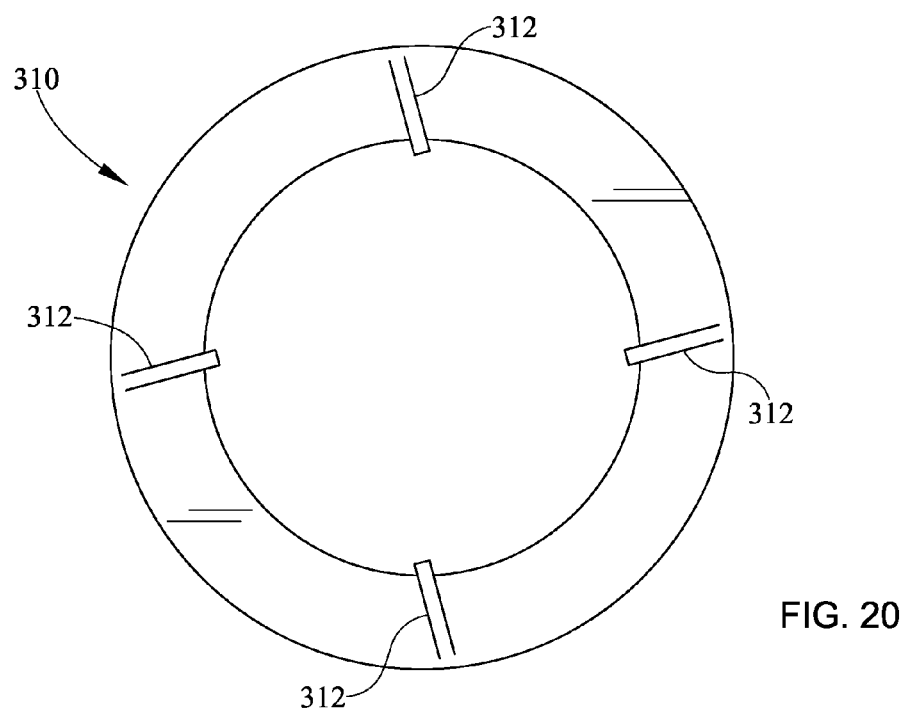
FIG. 20 is a bottom plan view of a second exemplary embodiment of a biasing mechanism.
Figure 18:
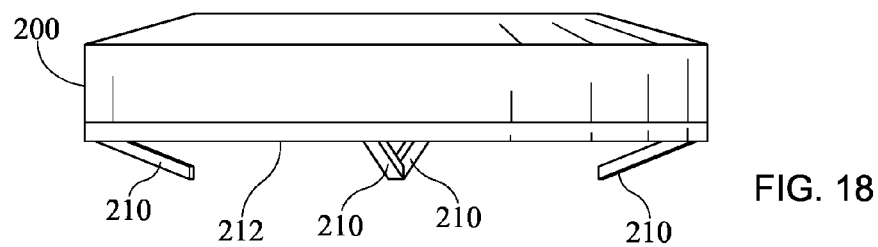
FIG. 18 is a front elevational view of an alternative exemplary embodiment of a biasing support with a built-in biasing mechanism.
Figure 21:
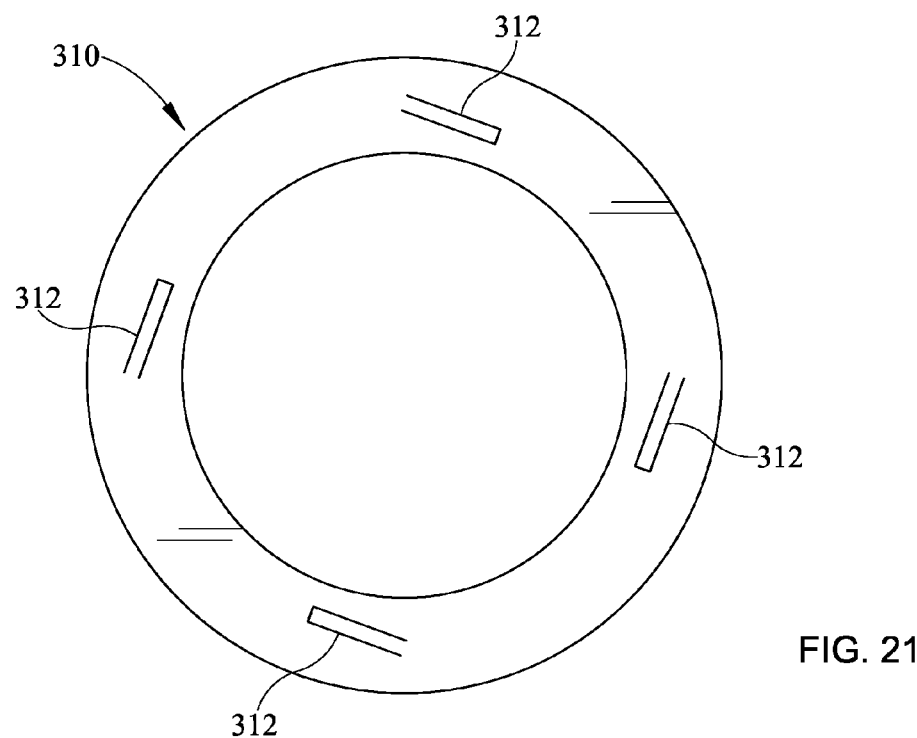
FIG. 21 is a bottom plan view of a third exemplary embodiment of a biasing mechanism.
Figure 22:
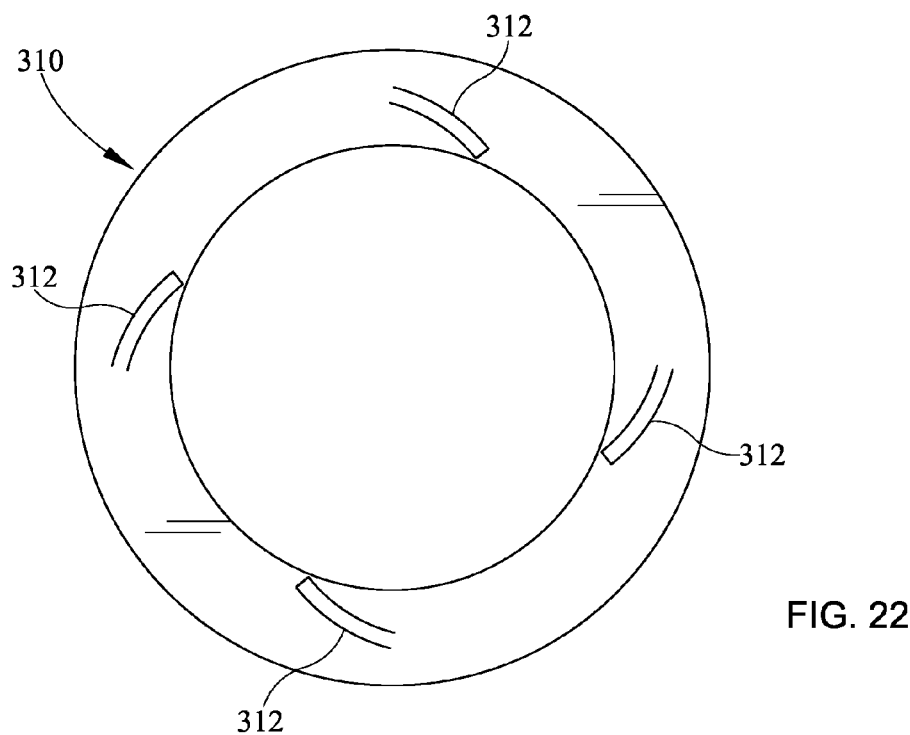
FIG. 22 is a bottom plan view of a fourth exemplary embodiment of a biasing mechanism.

FIGS. 18-19 show alternative exemplary embodiments of a biased support member in which a coiled spring is replaced by one or more different biasing mechanisms. FIG. 18 shows a biased support 200 which includes a biasing mechanism comprising at least one prong 210 extending from the bottom face 212 of the biased support 200. The prong 210 may be a finger projecting from the bottom face 212 at an angle, the finger having a degree of flexion.

In exemplary embodiments, as shown in FIGS. 19-22, a biased support member 300 may be contacted by a separate biasing member which may comprise a generally flat biasing disk 310 that may have prongs 312 formed as part of and extending from the bottom face 314 of the biasing disk, with the biasing disk 310 being associated with the bottom face of the biased support 300. In an exemplary embodiment, shown in FIG. 20, a plurality of prongs 310 may be each be an elongated finger that is oriented generally perpendicular to the tangent of the edge of the biasing disk 310 (i.e., generally along the line of the disk radius) and extends from proximate the edge of the biasing disk toward the center of the disk 310. In an exemplary embodiment, shown in FIG. 20, the prongs 312 may be disposed at an angle to the radius. In another exemplary embodiment, shown in FIG. 21, the prongs 312 may be disposed generally perpendicular to the radius. In another exemplary embodiment, shown in FIG. 22, the prongs 312 may be curved and disposed at an angle to the radius. In these various embodiments of prong construction and placement, the general purpose of the prongs 312 is to provide a generally uniform spring-like bias of the biased support 300 away from the base and toward the clip. In the embodiments of the anchor assembly 200, there is no spring 46 as the biasing structure is either built into the biased support or is a disk associated with the biased support.

Figure 23:
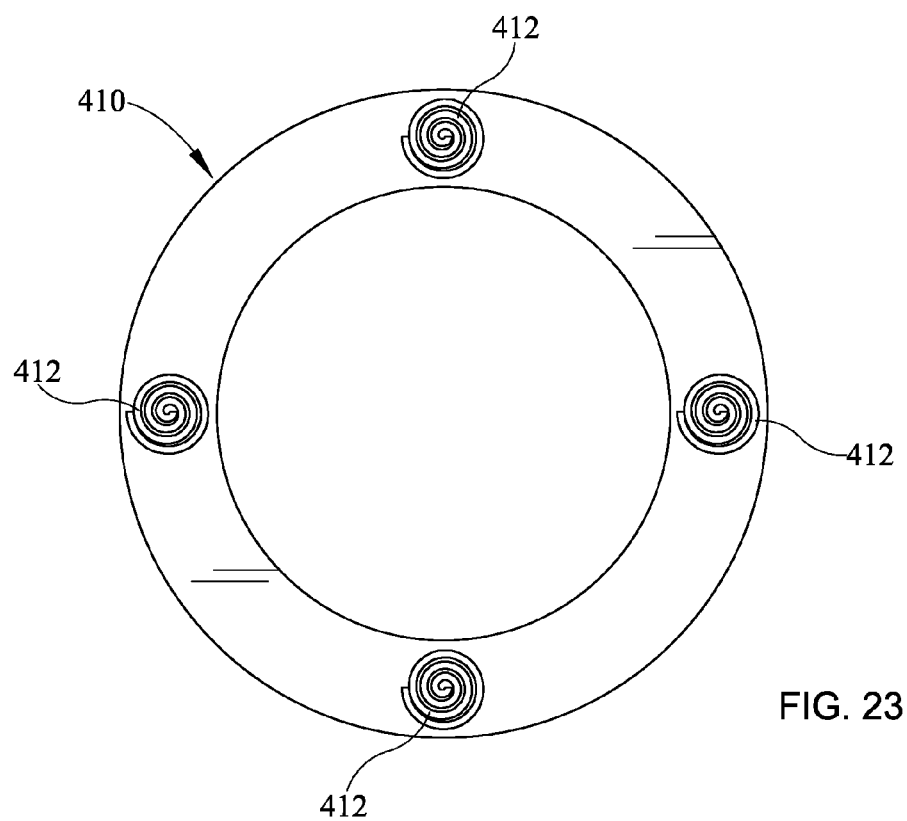
FIG. 23 is a bottom plan view of a fifth exemplary embodiment of a biasing mechanism.
Figure 24:
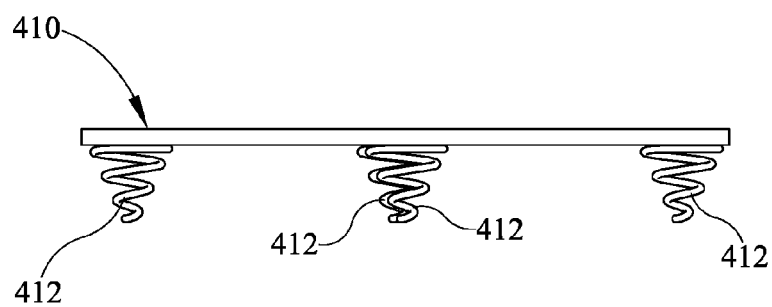
FIG. 24 is a side elevational view of the biasing mechanism of FIG. 23.

In an alternative embodiment, the biasing mechanism may be a plurality of springs spaced around the bottom face of the biased support. Alternatively, where the biasing mechanism comprises a disk 410, as shown in FIGS. 23-24, the disk 410 may have a plurality of springs 412 extending from one face, whereby one end portion of the springs 412 can contact the bottom surface of the biased support to bias the biased support 200 away from the base.

Figure 25:
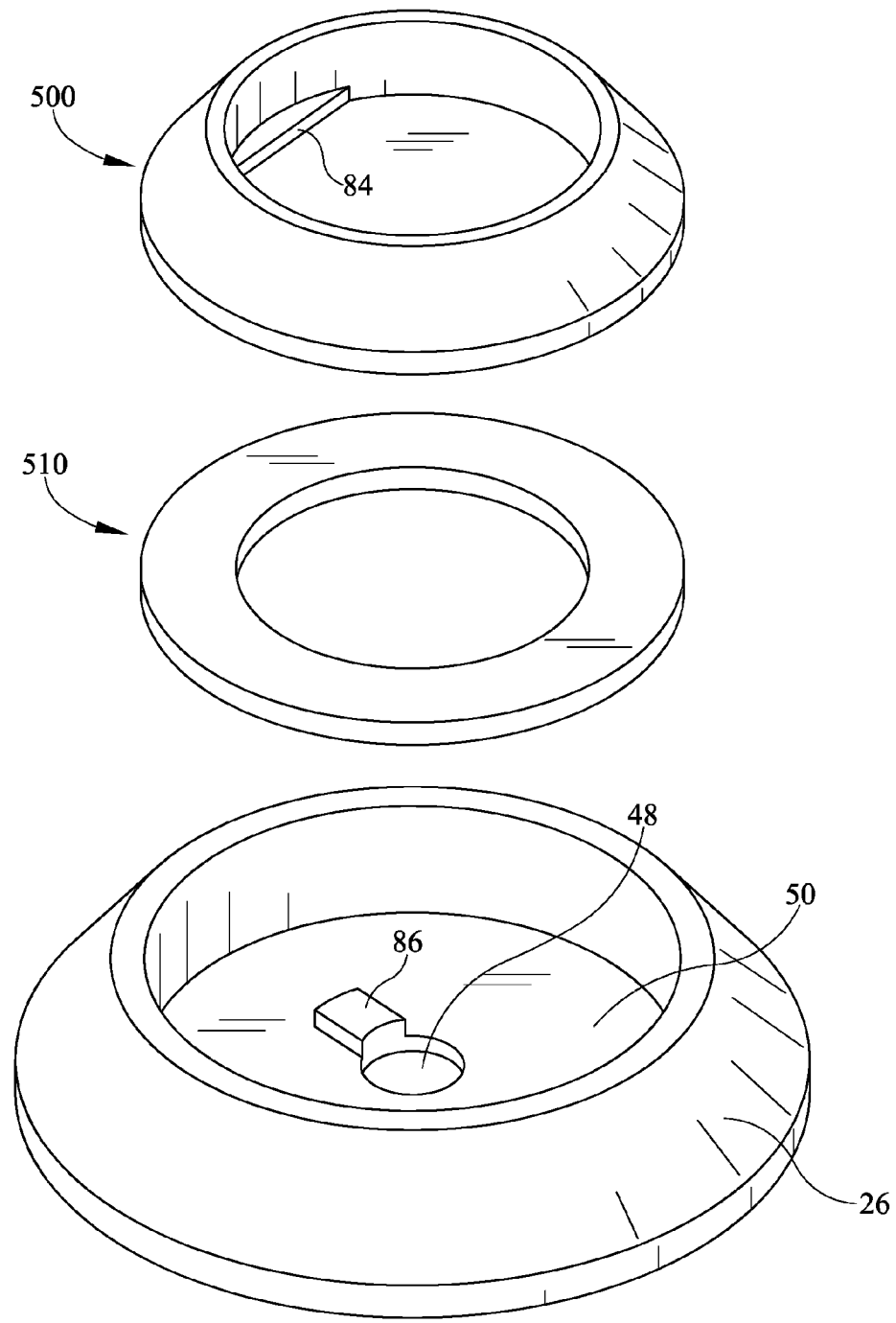
FIG. 25 is an exploded perspective view of an alternative exemplary embodiment of a biasing mechanism, showing the mechanism, a biasing support and a base.

In an alternative exemplary embodiment, shown in FIG. 25, a biased support 500 may include a biasing mechanism 510 comprising a compressible material that acts like a spring and biases the biased support toward the clip. In exemplary embodiments, the biasing mechanism compressible material may comprise a generally ring-shaped structure constructed from foam, rubber, or other compressible material. In alternative exemplary embodiments, the biasing mechanism may be a bladder filled with compressible material, such as, but not limited to, a gas. In exemplary embodiment in which a base is included, as shown in FIG. 25, the biasing mechanism may be adapted to at least partially sit in the cavity 50 of the base 26.

Figure 26:
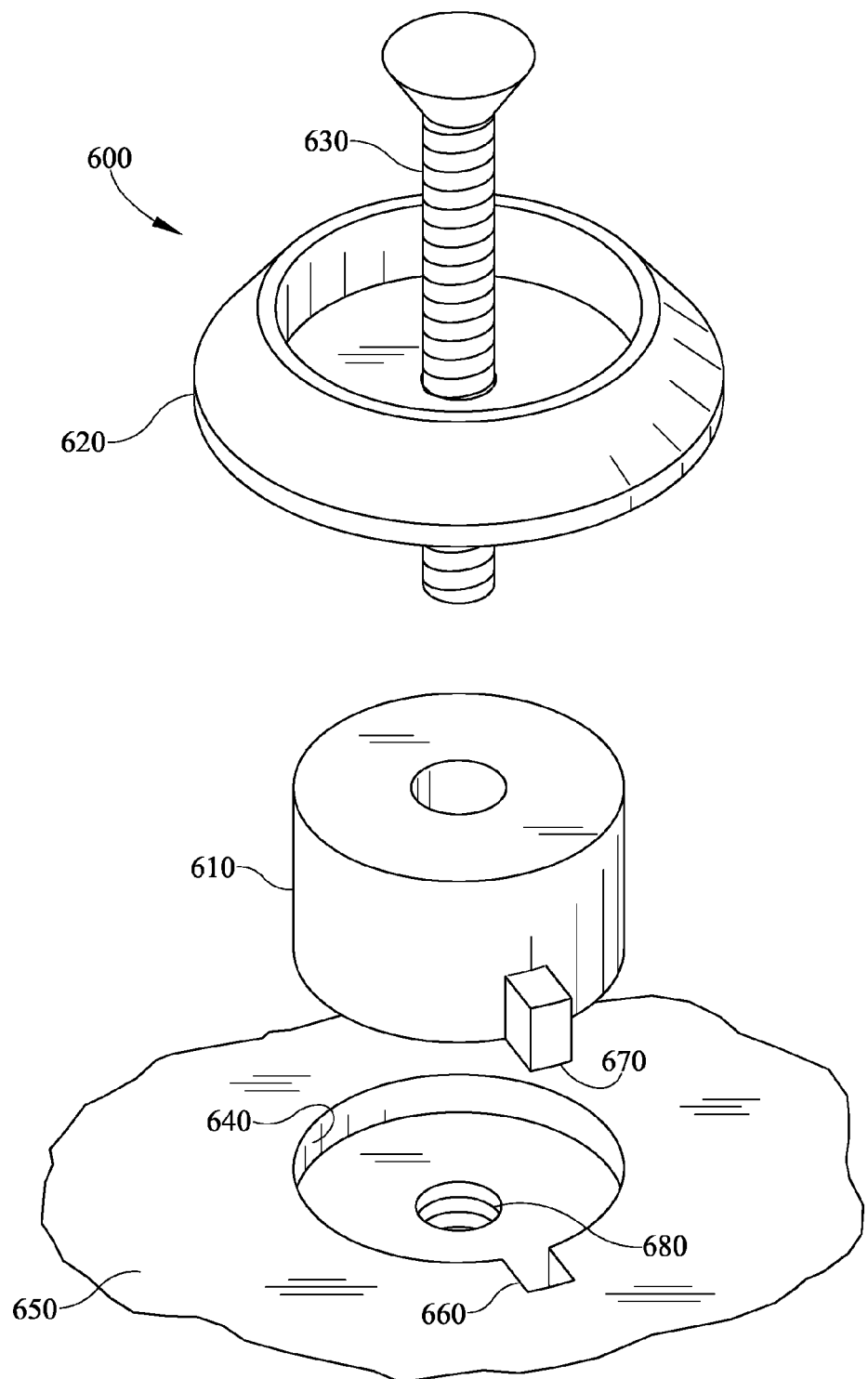
FIG. 26 is a schematic view of an exemplary embodiment showing a portion of a helmet with an aperture having a registration notch, a post having a registration key, a biasing support and a fastener.

In an alternative exemplary embodiment, shown in FIG. 26, an anchor assembly 600 comprises a post 610, biased support ring 620, and fastener 630, but without a base 26. In this embodiment, the fastener 630 is adapted to attach directly to an aperture or recess 640 in a helmet 650. In exemplary embodiments, the helmet 650 may have a featureless surface or boss. The biasing mechanism, e.g., a spring or other biasing mechanism or material, as described hereinabove, abuts or is proximate to the helmet 650 and is associated with the ring 620. In exemplary embodiments, the helmet 650 and post 610 may be constructed to have a registration mechanism so as to require registration of the post in a particular orientation when attached to the helmet. In exemplary embodiments, the registration mechanism may be a bore in the helmet for receiving the post contains either a notch (or slot) 660 or a tab (or more than one) that can receive a mating tab 670 or notch (or slot) associated with the post 610. The helmet 650 may further include a narrower bore 680 generally coaxial with, but deeper into the helmet 650 than, the post-accommodating bore 640, the narrower bore 680 being, in exemplary embodiments, threaded and able to accommodate the fastener 630. Alternatively, rather than a narrower bore, the helmet may include a boss in which the fastener is threaded or otherwise attached.

Although the present disclosure has been described with reference to particular means, materials, and embodiments, from the foregoing description, one skilled in the art can easily ascertain the essential characteristics of the present disclosure, and various changes and modifications may be made to adapt the various uses and characteristics without departing from the spirit and scope of the present disclosures and the invention as set forth in the following claims.

What is claimed is:

1. A locking clip and anchor assembly for a tether, comprising:
   (a) a clip adapted to attach to a tether, the clip comprising
      i. a base portion,
      ii. an opening defined in the base portion,
      iii. at least one tab extending into a portion of the opening,
      iv. at least one tether attachment means defined in the base portion, and,
   (b) an anchor assembly comprising
      i. a base member,
      ii. a post adapted to connect to the base, the post comprising an upper rim and a lower rim, and first, second, third and fourth slot portions, the first slot portion configured to receive the tab of the clip from exterior of the post, the second slot portion in communication with the first slot portion, and a catch in communication with the second slot portion to separate the first slot portion from the third slot portion, the third slot portion having a first part and a second part,
      iii. a biased support member having a top rim and a bottom surface and having an aperture adapted to receive the post and supported by the base, the biased support member being adapted to be biased in a position closer to the post upper rim and adapted to be an unbiased position closer to the base member when the clip is associated with the base member, and
      iv. means for biasing the biased support member.

2. The assembly of claim 1, further comprising a fastener configured to attach the post and base to a helmet.

3. The assembly of claim 1, wherein the biased support member is a ring.

4. The assembly of claim 1, wherein the base supports the post when the post abuts the base.

5. The assembly of claim 1, wherein the clip further comprises at least one grippable flange.

6. The assembly of claim 1, wherein the clip further comprises a plurality of grippable flanges.

7. The assembly of claim 1, wherein the clip is bendable at a preconfigured zone when subjected to a tension force that is applied at an angle to the base member.

8. The assembly of claim 7, wherein the clip allows preferential control of the disposition and amount of bending.

9. The assembly of claim 1,
   wherein the post, biased support, spring, and base are all cylindrically shaped,
   wherein the post is located in a cavity in the biased support member and supported by the base,
   wherein the biased support and biasing means are supported in a cavity in the base, and
   wherein the biased support and biasing means are movable with respect to the base.

10. The assembly of claim 1, wherein the opening in the clip is substantially circular.

11. The assembly of claim 1, wherein the biasing means comprises a spring.

12. The assembly of claim 1, wherein the biasing means comprises a plurality of springs extending from the bottom surface of the biased support member.

13. The assembly of claim 1, wherein the biasing means comprises at least one prong extending from the bottom surface of the biased support member.

14. The assembly of claim 1, wherein the biasing means comprises a disk having a top surface and a bottom surface and at least one prong extending at an angle from the bottom surface, each prong adapted to provide a biasing force under pressure when urged toward the bottom surface.

15. The assembly of claim 1, wherein the biasing means comprises a disk having a top surface and a bottom surface and including at least one spring extending from the bottom surface.

16. The assembly of claim 1, wherein the biasing means comprises a generally ring-shaped bladder filled with a compressible fluid.

17. The assembly of claim 1, wherein the biasing means comprises a generally ring-shaped compressible material.

18. The assembly of claim 1, wherein the biasing means comprises a generally ring-shaped piece of foam or rubber material.

19. The assembly of claim 1, wherein the post further comprises at least one first registration portion and the base member further comprises at least one second registration portion, the first and second registration portions being adapted to mate or interlock when the post is associated with the base member whereby the post associates with the base member in only one seating orientation.

20. The assembly of claim 19, wherein the first registration portion comprises a notch or flattened area and the second registration portion comprises a key or a flattened area.

21. The assembly of claim 1, wherein the post and the base together are indexed to achieve a preferential orientation to the support structure.

22. The assembly of claim 1,
wherein the opening in the clip further includes a second tab extending into a portion of the opening, wherein the second tab is spaced apart from the tab, and
wherein the post further comprises a second set of first, second, and third slot portions that receive the second tab and are correspondingly configured substantially the same as the first, second, and third slot portions that receive the tab.

23. The assembly of claim 22, wherein the opening in the clip is substantially circular and the tab and second tab are spaced apart from each other across the opening at an angle less than 180 degrees.

24. The assembly of claim 22, wherein the second tab is located at an asymmetrical location at the opening with respect to the tab.

25. The assembly of claim 23, wherein the clip is engageable with the post at no more than a single orientation.

26. The assembly of claim 22, wherein the clip is adapted to engage with the post only when the bottom face of the clip is facing the post.

27. The assembly of claim 22, wherein the first tab and second tab each have a width, the first tab width being greater than the second tab width.

28. The assembly of claim 1, wherein the catch includes an angled surface non-parallel with the second slot portion and configured to urge the tab to the third slot portion and discourage a false latching.

29. The assembly of claim 1, further comprising a slope located between the third slot portion and the fourth slot portion.

30. The assembly of claim 1, wherein the second part of the third slot portion and the fourth portion are located parallel to a top surface of the biased support.

31. The assembly of claim 1, wherein the clip has two slots defined therein.

32. The assembly of claim 1,
wherein the clip is configured to be movable to latched and unlatched conditions with respect to the anchor assembly,
wherein the biased support is movable in axially-opposed first and second directions along the post and is biased in the second direction by the biasing means,
wherein the second slot portion is concealed by the biased support when moved in the second direction by the biasing means,
wherein the second slot portion is exposed by the biased support when moved in the first direction by the clip that overcomes the bias of the biasing means,
wherein the third slot portion is in communication with both the second slot portion and the fourth slot portion such that a first part of the third slot portion is concealed by the biased support when moved in the second direction by the spring,
wherein a second part of the third slot portion is exposed both when the biased support is moved in the second direction by the spring, and when the biased support is moved in the first direction by the clip that overcomes the bias of the spring,
wherein the clip is pivotable in axially-opposed third and fourth directions with respect to the post when the tab is located in the second slot portion, and
wherein when the tab is located in the second part of the third slot portion and the biased support is moved in the second direction by the spring and the catch prevents the tab and clip from moving back to the second slot portion in the fourth direction, the clip is in the latched condition with respect to the anchor assembly.

33. The assembly of claim 1, wherein the clip is latched to the post when the tab is located in the second part of the third slot portion and the biased member is moved in the second direction by the bias of the spring that conceals the second slot portion.

34. The assembly of claim 1, wherein the fourth slot portion is in communication with the second part of the third slot portion,
wherein the fourth slot portion is exposed both when the biased support is moved in the second direction by the spring, and when the biased support is moved in the first direction by the clip that overcomes the bias of the spring, and,
wherein the clip and tab is movable in both the third and fourth directions, when the tab is located in the fourth tab portion.

35. The assembly of claim 1,
wherein the clip is configured to unlatch from the post when the clip moves the biased support in the first direction to overcome the spring bias and expose the second slot portion,
wherein the tab is movable from the third slot portion to the second slot portion when the clip is movable toward the fourth direction,
wherein the tab is movable from the second slot portion to the first slot portion when the clip continues to move in the fourth direction after having moved in the first direction, and,
wherein the tab is movable out of the first slot portion and separable from the post when the tab is movable in the second direction which puts the clip in the latched condition with respect to the anchor assembly.

36. The assembly of claim 1, further comprising a second clip substantially the same in construction as the clip.

37. A clip and locking anchor assembly, comprising:
(a) a clip that includes an opening with a tab extending into a portion of the opening, and wherein the clip is configured to attach to a tether; and,
(b) an anchor assembly that includes a post, and biased support;
wherein the clip is configured to be movable to latched and unlatched conditions with respect to the anchor assembly;
wherein the biased support is located adjacent the post;
wherein the biased support is movable in axially-opposed first and second directions along the post;
wherein the post includes a first slot portion configured to receive the tab of the clip from exterior of the post;
wherein the post also includes a second slot portion in communication with the first slot portion;
wherein the second slot portion is concealed by the biased support when moved in the second direction;
wherein the second slot portion is exposed by the biased support when moved in the first direction by the clip that overcomes the bias at the biased support;
wherein the post further includes a catch in communication with the second slot portion to separate the first slot portion from a third slot portion;

wherein the third slot portion is in communication with both the second slot portion and a fourth slot portion such that a first part of the third slot portion is concealed by the biased support when moved in the second direction;

wherein a second part of the third slot portion is exposed both when the biased support is moved in the second direction by the spring, and when the biased support is moved in the first direction by the clip that overcomes the bias of the biased support;

wherein the clip is pivotable in axially-opposed third and fourth directions with respect to the post when the tab is located in the second slot portion; and wherein when the tab is located in the second part of the third slot portion and the biased support is moved in the second direction and the catch prevents the tab and clip from moving back to the second slot portion in the fourth direction, the clip is in the latched condition with respect to the anchor assembly.

38. A locking clip and anchor assembly for a tether, comprising:
  (a) a clip adapted to attach to a tether, the clip comprising
    i. a base portion,
    ii. an opening defined in the base portion,
    iii. at least one tab extending into a portion of the opening,
    iv. at least one tether attachment means defined in the base portion, and,
  (b) an anchor assembly comprising
    i. a post comprising an upper rim and a lower rim, and first, second, third and fourth slot portions, the first slot portion configured to receive the tab of the clip from exterior of the post, the second slot portion in communication with the first slot portion, and a catch in communication with the second slot portion to separate the first slot portion from the third slot portion, the third slot portion having a first part and a second part,
    ii. a biased support member having an aperture adapted to receive the post, the biased support member being adapted to be biased in a position closer to the post upper rim, and
    iii. means for biasing the biased support member,
    iv. a fastener,
  wherein the anchor assembly is adapted to connect to a helmet, the helmet having an aperture defined therein sized to receive the fastener.

* * * * *